United States Patent [19]

Young

[11] Patent Number: 4,496,800
[45] Date of Patent: Jan. 29, 1985

[54] RINGING GENERATOR TESTING ARRANGEMENT FOR A DIGITAL TELEPHONE NETWORK

[75] Inventor: John S. Young, Scottsdale, Ariz.

[73] Assignee: Gte Automatic Electric Inc., Northlake, Ill.

[21] Appl. No.: 506,742

[22] Filed: Jun. 22, 1983

[51] Int. Cl.³ ............................................. H04M 3/22
[52] U.S. Cl. ...................... 179/175.2 R; 179/84 VF; 324/78 D
[58] Field of Search .................. 179/175.2 B, 175.2 R, 179/84 VF, 84 A, 84 R, 18 HB, 51 AA; 324/78 R, 78 D; 370/13; 328/129.1, 139, 140

[56] References Cited
U.S. PATENT DOCUMENTS
3,971,897 7/1976 Ohl et al. .................. 179/84 VF Primary Examiner—Stafford D. Schreyer
Attorney, Agent, or Firm—Anthony Miologos; Peter Xiarhos

[57] ABSTRACT

A ringing generator testing arrangement for a digital telephone network is shown comprising a zero crossing detector connected to the ring lead of a line circuit under test. The zero crossing detector gates a clock signal into a counter circuit during the negative to positive transition of the ringing generator signal positive half cycle. The counter circuit advances until the next positive to negative transition of the ringing generator signal. At this time, the zero crossing detector cuts off the clock signal and the counter circuit transmits to a central control complex a count representing a measured interval of the ringing generator positive half cycle.

9 Claims, 5 Drawing Figures

RINGING GENERATOR TESTING ARRANGEMENT FOR A DIGITAL TELEPHONE NETWORK

BACKGROUND OF THE INVENTION

This invention relates in general to ringing generator testing arrangements and more particularly to an arrangement for determining the presence and frequency of ringing generator in a digital telephone network.

Line ringing tests verify the performance of line circuits, ringing control circuitry as well as the performance of the telephone networks ringing plant.

Typically these tests are performed by accessing the line circuits under test and configuring the line circuits accessed for ringing. A ringing generator signal is then applied to the line, sensed and measured under closed loop conditions verifying the presence of ringing signal as well as its frequency.

In digital telephone networks these testing procedures function under program control of a central control complex. The central control complex via an administrative input/output interface can configure the line circuits to be tested and apply the ringing generator signal.

In the past the performance of the ringing circuitry and ringing plant were measured by analog devices monitored by telephone network personnel. In program controlled testing systems however, it becomes advantageous to read the results of such tests directly into the central control complex. The program thus would interpret and determine the results of the test. In order to accomplish this end, a means of converting the analog frequency and waveform voltages of the ringing generator into a digital value is normally required in order to input these values into the central control complex.

It is therefore the object of the present invention to provide an arrangement under program control for verifying the presence and frequency of ringing generator in line circuits under test and to sense and report the results of these tests to a central control complex.

SUMMARY OF THE INVENTION

The present invention is an arrangement used to verify the presence and frequency of a ringing generator used in a digital telephone system. The arrangement of the present invention is connected to a line circuit having a tip and ring lead and a source of alternating ringing generator signals under control of a central control complex.

The present invention comprises a zero crossing detector means connected to the ring lead of a line circuit. The zero crossing detector means produces a first output signal responsive to the negative to positive transition of the ringing generator signal and a second output signal responsive to the first positive to negative transition of the ringing generator signal. A clock signal generating means develops and produces a continuous output of clock signals which are applied to counting means. The counting means are further connected to the zero crossing detector means and responsive to the zero crossing detector means first output signal counts the clock signals for a period until the zero crossing detector outputs the second output signal.

At this time the counting means transmits to the central control complex a count representing the measured interval of the positive half cycle of the ringing generator signal. Through a counting algorithm, the frequency of the generator is calculated using the measured interval of the positive half cycle.

The arrangement further includes a ring detector means connected to the ring lead of the line circuit and arranged to produce an output signal to the central control complex responsive to the presence of the ringing generator signal. The ring detector means is used to verify that ringing signal generator is present on the line and also in combination with the zero crossing detector second output signal, to develop a reset signal resetting the counting means.

DESCRIPTION OF THE PREFERRED EMBODIMENT

Figure 1:
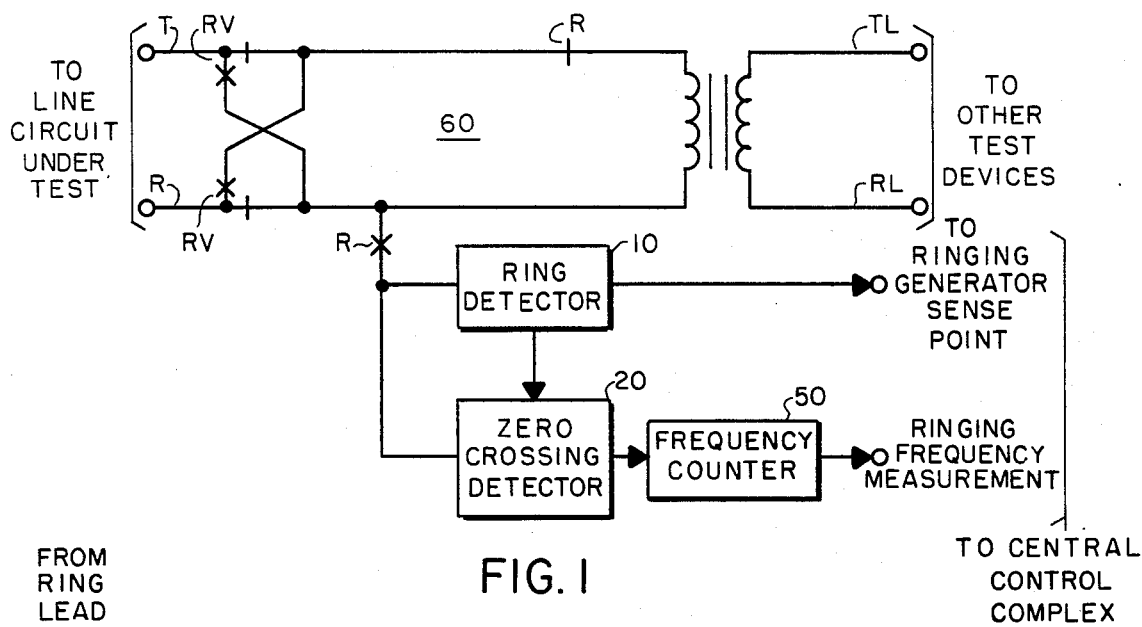
FIG. 1 is a block diagram showing the arrangement of the present invention.

Turning now to FIG. 1, a block diagram of the elements of the present invention is illustrated. These elements comprise a ring detector 10, a zero crossing detector 20 and a frequency counter 50. A ringing signal is applied to detector 10 and detector 20 via a line test bus 60. The test bus includes tip (T) and ring (R) leads connected on one side to the line circuit under test and on the opposite side via leads TL and RL to other test devices. Ring detector 10 and zero crossing detector 20 are connected to the test bus 60 via relay R. Relay RV allows the present invention to test line side selections, i.e. multi-party lines using divided ringing which require that the ringing generator be applied to either the ring or the tip conductor depending upon the party to be alerted.

Ring detector 10 outputs a ring generator sense signal and frequency counter 50 a ring frequency measurement which under program control, is output to a central control complex.

Figure 2:
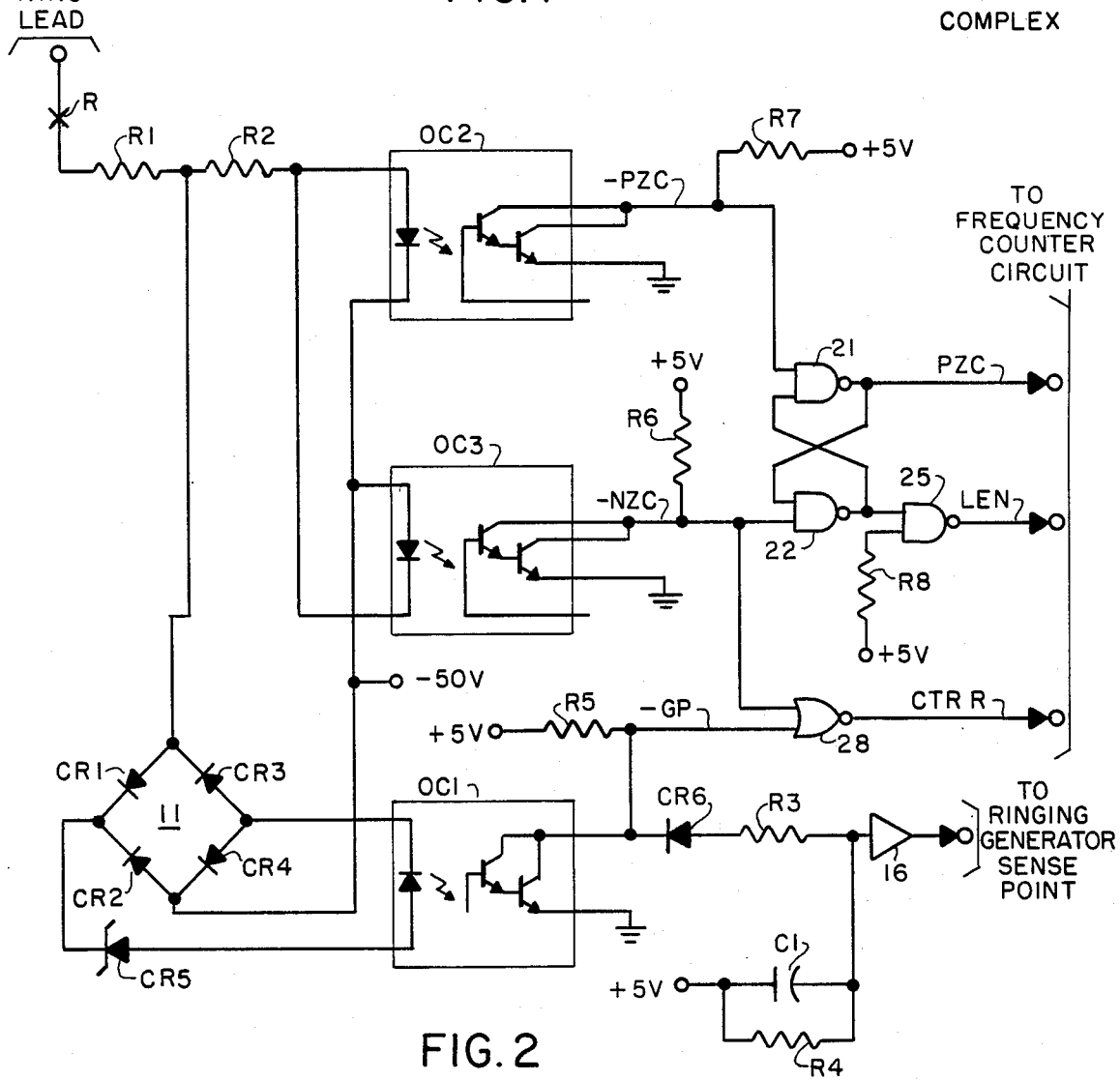
FIG. 2 is a detailed schematic illustrating the ring detector and zero crossing detector of the present invention.

Turning now to FIG. 2, a detailed schematic of ring detector 10 and zero crossing detector 20 is illustrated. Ring detector 10 is comprised of resistors R1 and R2, diode bridge 11, diode CR5 and optical coupler OC1. The balance of the circuit is comprised of capacitor C1, resistors R3 and R4, diode CR6 and line driver 16.

The zero crossing detector 20 is comprised of optical couplers OC2 and OC3. NAND gates 21 and 22 which are configured as a flip-flop, NAND gate 25 and a NOR gate 28. Resistors R6, R7 and R8 are pull-up resistors.

Figure 4A:
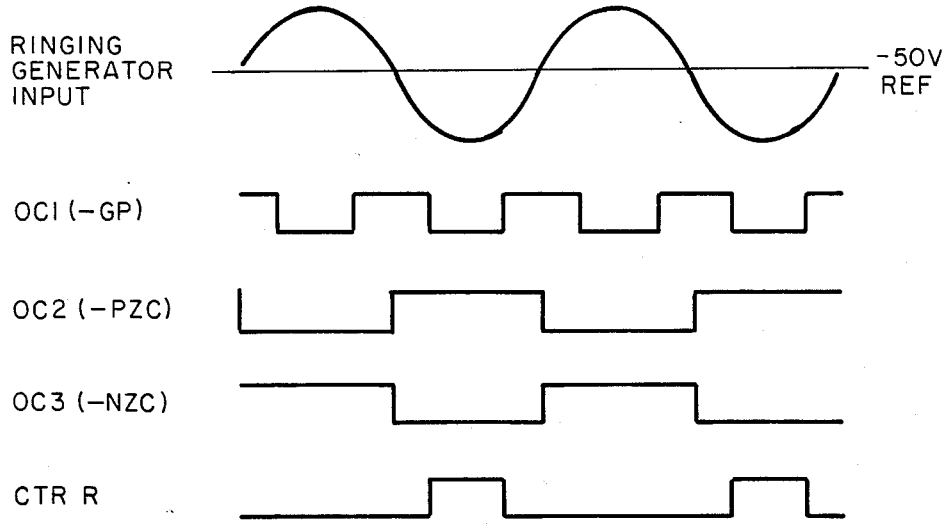
FIG. 4A is a timing diagram showing the relative timing relationships between the ringing generator input signal and the output signals developed by the ring detector and zero crossing detector.

With additional reference to FIG. 4A a detailed description of the operation of ring detector 10 and zero crossing detector 20 will now be explained in detail. Ring generator voltage is input via relay R when made. Relay R can be made and broken under program control of the central control complex. The voltage received is periodically high enough so that the drop across resistors R2 exceeds drops across two of the bridge diodes in diode bridge 11, diode CR5 and the diode section of optical coupler OC1. At this time OC1 conducts turning on the photo Darlington pair and allowing current to flow through the network comprised of capacitors C1, resistors R4, R3 and diode CR6. This signal produced by the network is integrated by capacitor C1 developing signal −GP (−GP). The negative cycles of signal −GP occur at the most positive and most negative portion of the ring generator sine wave. Signal −GP is output via a driver 16 to the central control complex indicating that ringing generator is present. Normally this indicator should follow the ring cycle of two seconds on and four seconds off.

Figure 4B:
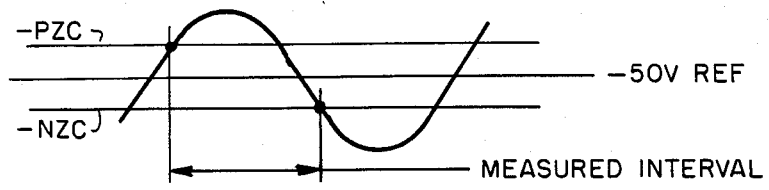
FIG. 4B is a representation of the AC ringing generator input showing the measured interval which the arrangement of the present invention uses to measure the frequency of the ringing generator signal.

Zero crossing of the ring generator input is determined by optical couplers OC2 and OC3. Optical coupler OC2 develops signal −PZC (−PZC) during the positive half cycle of the ringing generator input. Optical coupler OC3 develops signal −NZC (−NZC) during the negative half cycle of the ring generator input voltage. With reference to FIG. 4B, at the beginning of the positive voltage half cycle, −PZC is input into NAND gate 21 which sets and develops output signal PZC. Signal PZC is active until reset by signal −NZC applied to NAND gate 22 at the beginning of the negative half cycle. Therefore, signal PZC is active for the positive half cycle of the ring generator input.

The signal output of flip-flop gate 22 is applied to gate 25 which develops a latch enable signal (LEN). As the negative half cycle advances, signal −GP developed by the ring detector optical coupler OC1 is logically combined with −NZC at NOR gate 28 developing a reset signal (CTR R). Signals PZC, LEN and CTR R are output from the zero crossing detector to frequency counter 50.

Figure 3:
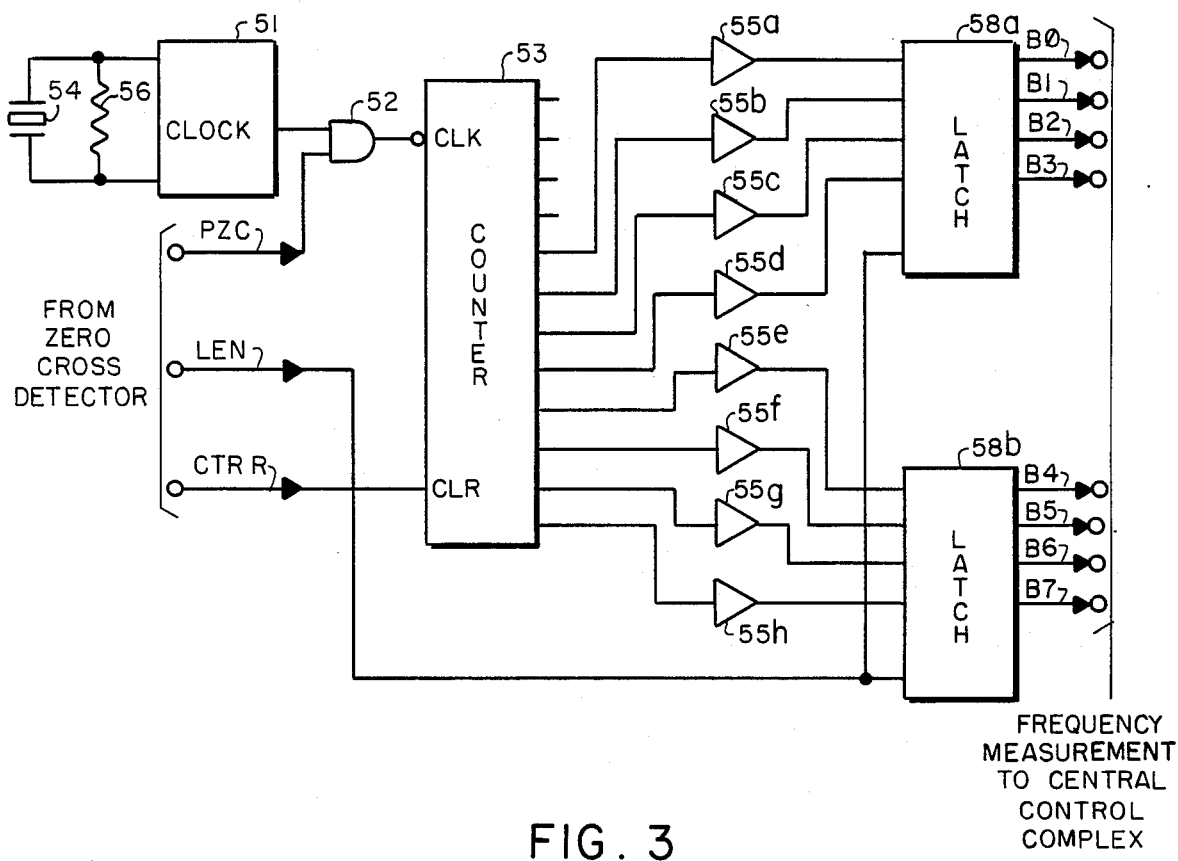
FIG. 3 is a detailed schematic illustrating the frequency counter of the present invention.

Turning now to FIG. 3, a detailed schematic of frequency counter 50 is illustrated. Frequency counter 50 is comprised of a 100 kHz clock 51 having a crystal 54 and a resistive network 56 providing a stable frequency source for the clock. Clock signals output by clock 51 are applied to an input of a NAND gate 52 whose output is connected to a 14-bit binary counter 53. The outputs of counter 53 are connected to two 4-bit latches 58a and 58b via drivers 55a–55h. The output of latches 58a and 58b output an 8-bit data word representative of the measured interval of the ring generator input to the central control complex.

During the negative half cycle of the ring generator input signals −GP and −NZC via NOR gate 28 produce reset signal CTR R which is applied to the clear input of counter 53. At this time the counter is reset in preparation for another measurement on the next positive half cycle. After the zero crossing of the positive half cycle, signal PZC is output from the flip-flop of FIG. 2, gating the 100 kHz clock via gate 52 to the counter 53. The counter advances until the beginning of the negative half cycle where −NZC resets the flip-flop opening the clock input. Thus during the measured interval the contents of the counter represent the time interval of a half cycle of the received ring generator waveform. At this time the outputs of counter 53 apply the data gathered during the measured interval to latches 58a and 58b via drivers 55a and 55h. When −NZC reset the flip-flop the output signal from gate 22 was combined with a positive logic signal at the input of gate 25 developing a latch enable signal (LEN). LEN is used to capture into latches 58a and 58b the output of counter 53 at the end of the measured interval. At this time latch 58a outputs B0–B3 and latch 58b outputs B4–B7 contain the measured interval of the ring generator positive half cycle.

A logic 1 contained in B0 would represent an elapsed time of 0.16 milliseconds. The 0.16 millisecond time doubles for each successive bit until B7 which will indicate an interval of 20.48 milliseconds. Therefore, the half cycle measurement is obtained by summing the weighted values for each bit that is at a logic 1. The translation of measured interval to ring frequency would be accomplished in the central control complex using an algorithm to translate the time measurement to a frequency output. For example, the expected value of a measured interval of 30 milliseconds could indicate a ringer frequency of 16.67 hertz or a measured interval of 7.5 milliseconds would indicate a ringer frequency of 66.67 hertz.

At the most negative point of the ring generator waveform, −GP and −NZC are logically combined by NOR gate 28 to form the reset signal CTR R which clears counter 53 for the next measurement before the next positive half cycle.

The present invention has been described with reference to a specific embodiment thereof for the purposes of illustrating the manner in which the invention may be used to advantage. It will be appreciated by those skilled in the art that the invention is not limited thereto. Accordingly, any and all modifications, variations or equivalent arrangements which may occur to those skilled in the art should be considered to be within the scope of the invention.

What is claimed is:

1. An arrangement for measuring the frequency of a ringing generator, including a line circuit having a tip and a ring lead and a source of alternating current ringing generator signals under control of a central control complex, said arrangement comprising:

zero crossing detector means connected to said ring lead and arranged to produce a first output signal responsive to the negative to positive transition of said ringing generator signals and a second output signal responsive to the first positive to negative transition of said ringing generator signal;

clock signal generating means developing and producing a continuous output clock signal; and counting means connected to said zero crossing detector means and to said clock signal generating means and responsive to said zero crossing detector means first output signal, said counting means receives and counts said clock signals for a period until said zero crossing detector means second output signal, whereby responsive to said second output signal said counter transmits to said central control complex a count representing the measured interval of said ringing generator signal.

2. The arrangement for measuring the frequency of a ringing generator as claimed in claim 1, wherein there is further included a ring detector means connected to said ring lead arranged to produce an output signal to said central control complex responsive to the presence of said ringing generator signal.

3. The arrangement for measuring the frequency of a ringing generator as claimed in claim 2, wherein said counting means includes a reset input and said zero crossing detector means second output and said ring detector means output are logically combined and applied to said counter means reset input resetting said counting means.

4. The arrangement for measuring the frequency of a ringing generator as claimed in claim 2, wherein said ring detector means comprises an optical coupler including a diode input section and a transistor output section, said input section connected via a diode bridge network and a voltage measuring resistor to said ring lead and said transistor output section connected to an integrator network producing a negative signal responsive to the most negative and the most positive swing of said alternating current ring generator signal.

5. The arrangement for measuring the frequency of a ringing generator as claimed in claim 4, wherein said zero crossing detector includes a NOR gate having said zero crossing detector second optical coupler output applied to one input and said ring detector negative signal applied to another input, whereby a positive reset signal is output to said counting means from said NOR gate responsive to said optical coupler negative output and said ring detector negative output signals respectively.

6. The arrangement for measuring the frequency of a ringing generator as claimed in claim 1, wherein said zero crossing detector means comprises:

a first optical coupler having a diode detector section and a transistor output section, said diode detector section connected to said ring lead and said transistor section provides a negative going output signal responsive to the positive half cycle and a positive output signal responsive to the negative half cycle of said alternating current ringing generator signal;

a second optical coupler including a diode detector section and a transistor output section, said diode section connected to said ring lead and said transistor output section produces a positive output signal responsive to the positive half cycle and a negative output signal responsive to the negative half cycle of said alternating current ringing generator signal; and a flip-flop receiving said first and second optical coupler output signals, said flip-flop developing said zero crossing detector first output signal responsive to said first optical coupler negative signal and said second output coupler positive signal and said zero crossing detector second output signal responsive to said first optical coupler positive signal and said second optical coupler negative signal.

7. An arrangement for measuring the frequency of a ringing generator as claimed in claim 4, wherein said counting means comprises a binary counter connected to the output of a NAND gate, said NAND gate receiving said clock signal generator output on one input and said zero crossing detector first and second output signals at a second input, whereby responsive to said zero crossing detector first input signal said clock signals are input into said counter and responsive to said zero crossing detector second output signal said clock signals are stopped.

8. The arrangement for measuring the frequency of a ringing generator as claimed in claim 7, wherein said counting means further includes a plurality of latches having inputs connected to said binary counter outputs and outputs connected to said central control complex, each of said latches including an enable input, said enable input arranged to receive a latch enable signal from said zero crossing detector flip-flop capturing said counter output and transmitting said counter output to said central control complex.

9. The arrangement for measuring the frequency of a ringing generator as claimed in claim 8, wherein said zero crossing detector flip-flop further produces output signals complementary to said zero crossing detector first and second output signals, and said flip-flop output signals are applied to one input of a NAND gate, said second NAND gate input receiving a positive input signal and said NAND gate outputting said latch enable signal responsive to said zero crossing detector second output signal.

* * * * *